US012091766B2

(12) United States Patent
Kawasaki et al.

(10) Patent No.: US 12,091,766 B2
(45) Date of Patent: Sep. 17, 2024

(54) ELECTROLYTIC COPPER FOIL AND METHOD FOR PRODUCING SAME

(71) Applicant: NIPPON DENKAI, LTD., Chikusei (JP)

(72) Inventors: Toshio Kawasaki, Chikusei (JP); Tsuyoshi Onuma, Chikusei (JP); Yasuhiro Endo, Chikusei (JP)

(73) Assignee: NIPPON DENKAI, LTD., Chikusei (JP)

( * ) Notice: Subject to any disclaimer, the term of this patent is extended or adjusted under 35 U.S.C. 154(b) by 699 days.

(21) Appl. No.: 17/311,231

(22) PCT Filed: Dec. 3, 2019

(86) PCT No.: PCT/JP2019/047230
§ 371 (c)(1),
(2) Date: Jun. 4, 2021

(87) PCT Pub. No.: WO2020/121894
PCT Pub. Date: Jun. 18, 2020

(65) Prior Publication Data
US 2022/0112618 A1   Apr. 14, 2022

(30) Foreign Application Priority Data

Dec. 10, 2018   (JP) ................. 2018-231072

(51) Int. Cl.
  *C25D 1/04*   (2006.01)
  *B32B 15/00*   (2006.01)
  (Continued)

(52) U.S. Cl.
  CPC ............... *C25D 1/04* (2013.01); *B32B 15/00* (2013.01); *B32B 15/01* (2013.01); *B32B 15/20* (2013.01);
  (Continued)

(58) Field of Classification Search
  CPC . C25D 1/04; C25D 3/38; C25D 5/605; C25D 5/60; H01M 4/661; Y02E 60/10;
  (Continued)

(56) References Cited

U.S. PATENT DOCUMENTS

2013/0244086 A1   9/2013   Iriyama et al.
2018/0102546 A1   4/2018   Kim

FOREIGN PATENT DOCUMENTS

| JP | 2000182623 A | 6/2000 |
| JP | 2012054198 A | 3/2012 |
| JP | 2012241232 A | 12/2012 |
| JP | 2018063938 A | 4/2018 |

(Continued)

OTHER PUBLICATIONS

Machine Translation, Lee et al., KR 101755203 B1, Jul. 10, 2017. (Year: 2017).*

(Continued)

*Primary Examiner* — Michael E. La Villa
(74) *Attorney, Agent, or Firm* — Myers Bigel, P.A.

(57) ABSTRACT

An electrolytic copper foil having higher electrical conductivity, and a method for producing the same are provided. The electrolytic copper foil has a carbon content of 5 ppm or less, a sulfur content of 3 ppm or less, an oxygen content of 5 ppm or less, and a nitrogen content of 0.5 ppm or less; has a total content of carbon, sulfur, oxygen, nitrogen, and hydrogen of 15 ppm or less; and has a number of grains of 8.0 to 12.0/µm², the number of grains changing to 0.6 to 1.0/µm² by heating the electrolytic copper foil at 150° C. for 1 hour. A method for producing this electrolytic copper foil includes cleaning a copper raw material; dissolving the copper raw material after the cleaning to obtain an electrolytic solution having a total organic carbon of 10 ppm or less; and electrolyzing the electrolytic solution to obtain the electrolytic copper foil.

5 Claims, 1 Drawing Sheet

(51) Int. Cl.
*B32B 15/01* (2006.01)
*B32B 15/20* (2006.01)
*C22C 9/00* (2006.01)
*C25D 3/38* (2006.01)
*C25D 5/00* (2006.01)
*H01M 4/66* (2006.01)

(52) U.S. Cl.
CPC ............... *C22C 9/00* (2013.01); *C25D 3/38* (2013.01); *C25D 5/60* (2020.08); *C25D 5/605* (2020.08); *H01M 4/661* (2013.01); *Y02E 60/10* (2013.01); *Y10T 428/12431* (2015.01); *Y10T 428/12903* (2015.01)

(58) Field of Classification Search
CPC ............ C22C 9/00; Y10T 428/12903; Y10T 428/12431; B32B 15/00; B32B 15/01; B32B 15/20
See application file for complete search history.

(56) References Cited

FOREIGN PATENT DOCUMENTS

| | | |
|---|---|---|
| JP | 2018137343 A | 8/2018 |
| KR | 101755203 B1 * | 7/2017 |
| KR | 20180090532 A | 8/2018 |
| WO | 2009057688 A1 | 5/2009 |
| WO | 2014178327 A1 | 11/2014 |

OTHER PUBLICATIONS

"Request for the Submission of an Opinion and English language translation", Korean Application No. 10-2021-7016841, Aug. 16, 2022, 7 pp.
"English translation of International Search Report", International Application No. PCT/UP2019/047230, Feb. 10, 2020, 2 pp.
"Communication with Supplementary European Search Report", EP Application No. 19894423.3, Dec. 23, 2021, 26 pp.

* cited by examiner

ELECTROLYTIC COPPER FOIL AND METHOD FOR PRODUCING SAME

RELATED APPLICATIONS

This application is a 35 U.S.C. § 371 national stage application of PCT Application No. PCT/JP2019/047230, filed on Dec. 3, 2019, which claims priority from Japanese Patent Application No. 2018-231072, filed on Dec. 10, 2018, the contents of which are incorporated herein by reference in their entireties. The above-referenced PCT International Application was published in the Japanese language as International Publication No. WO 2020/121894 A1 on Jun. 18, 2020.

TECHNICAL FIELD

The present invention relates to an electrolytic copper foil and to a method for producing the same, and more particularly, relates to an electrolytic copper foil for a negative electrode current collector of a secondary battery such as a lithium ion battery or for a printed wiring board, and to a method for producing the same.

BACKGROUND ART

In recent years, electrolytic copper foils have been used in various applications such as secondary batteries such as lithium ion batteries and printed wiring boards because, compared with piezoelectric copper foils, they are superior in the ability to be mass produced and to be produced at relatively low cost. In particular, in a secondary battery such as a lithium ion battery, an electrolytic copper foil is suitably used as the material of the negative electrode current collector. Examples of the reasons include high adhesiveness to the negative electrode active material composed of carbon and the like, low production cost, and also high productivity, as described above, and the ease of forming a thinner layer.

For such electrolytic copper foils, for example, Patent Document 1 discloses an electrolytic copper foil characterized in that the carbon content in the copper foil is 5 ppm or less, and the sulfur content is 3 ppm or less, and states that this electrolytic copper foil is excellent in tensile strength at ordinary temperature and after heating, and is excellent in elongation rate at ordinary temperature and after heating, and therefore, it can be suitably used as a current collector copper foil for a secondary battery.

Patent Document 2 states that although there are tendencies that as the density of components mounted on a printed wiring board increases, miniaturization of the printed wiring board is also required due to the miniaturization of a product, and the copper foil pattern formation range is also limited, heat generation of the copper foil pattern occurs when there is a place to which a current exceeding the amount of an allowable current is applied. Patent Document 2 discloses that as a way for suppressing the heat generation of the copper foil pattern, it is necessary to decrease resistivity, that is, increase electrical conductivity.

REFERENCE DOCUMENT LIST

Patent Documents

Patent Document 1: JP 2000-182623 A
Patent Document 2: JP 2018-137343 A

SUMMARY OF THE INVENTION

Problem to be Solved by the Invention

In this manner, an electrolytic copper foil is suitable as a current collector for a secondary battery, but the number of secondary batteries for in-vehicle applications has increased rapidly in recent years, and in order to suppress heat generation due to increased capacity, higher electrical conductivity is required. In addition, although an electrolytic copper foil is suitable as the wiring of a printed board because of its high electrical conductivity, an electrolytic copper foil having a lower resistivity, i.e., a higher electrical conductivity, is required because the resistivity of copper has increased due to the heat generation of a printed board caused by an increase in capacity for data and the like in recent years.

Accordingly, it is an object of the present invention to provide an electrolytic copper foil having higher electrical conductivity and a method for producing the same.

Means for Solving the Problem

In order to achieve the object, one aspect of the present invention is an electrolytic copper foil having a carbon content of 5 ppm or less, a sulfur content of 3 ppm or less, an oxygen content of 5 ppm or less, a nitrogen content of 0.5 ppm or less; having a total content of carbon, sulfur, oxygen, nitrogen, and hydrogen of 15 ppm or less; and having a number of grains of 8.0 to $12.0/\mu m^2$, the number of grains changing to 0.6 to $1.0/\mu m^2$ by heating this electrolytic copper foil at 150° C. for 1 hour.

It is preferred that the electrolytic copper foil has an electrical conductivity of 96.8 to 99.7% IACS, the electrical conductivity increasing by at least 2% IACS and changing to 99.7 to 103.0% IACS by heating this electrolytic copper foil at 150° C. for 1 hour.

Another aspect of the present invention is a method for producing an electrolytic copper foil, this method including: cleaning a copper raw material; dissolving the copper raw material after the cleaning to obtain an electrolytic solution having a total organic carbon (TOC) of 10 ppm or less; and electrolyzing the electrolytic solution to obtain an electrolytic copper foil having a carbon content of 5 ppm or less, a sulfur content of 3 ppm or less, an oxygen content of 5 ppm or less, a nitrogen content of 0.5 ppm or less; having a total content of carbon, sulfur, oxygen, nitrogen, and hydrogen of 15 ppm or less; and having a number of grains of 8.0 to $12.0/\mu m^2$, the number of grains changing to 0.6 to $1.0/\mu m^2$ by heating the electrolytic copper foil at 150° C. for 1 hour.

It is preferable that the cleaning be carried out by heat cleaning, compressed steam cleaning, acid immersion cleaning, or a combination thereof, thereby obtaining the electrolytic solution having a TOC of 10 ppm or less in the dissolving. Alternatively, it is also preferable that the cleaning be carried out by ultrasonic cleaning, ozone water cleaning, superheated steam cleaning, or a combination thereof, thereby obtaining the electrolytic solution having a TOC of 10 ppm or less in the dissolving.

Effects of the Invention

According to the present invention, by obtaining an electrolytic copper foil from an electrolytic solution in which the content of impurities is controlled, such as the TOC being set at 10 ppm or less, this electrolytic copper foil has a number of grains of 8.0 to $12.0/\mu m^2$ in at the time of production, but this number of grains changes to 0.6 to 1.0/μm² when the electrolytic copper foil is subjected to heating at least at 150° C. for 1 hour. Therefore, the electrical conductivity also improves, and thus, when used, for example, as the material of the negative electrode current collector of a secondary battery, the electrolytic copper foil can exhibit excellent electrical conductivity in the secondary battery produced through the heating.

BRIEF DESCRIPTION OF THE DRAWINGS

FIG. 1 shows scanning electron micrographs showing the microstructure of a cut surface of an example of an electrolytic copper foil according to the present invention.

MODE FOR CARRYING OUT THE INVENTION

Figure 1A:
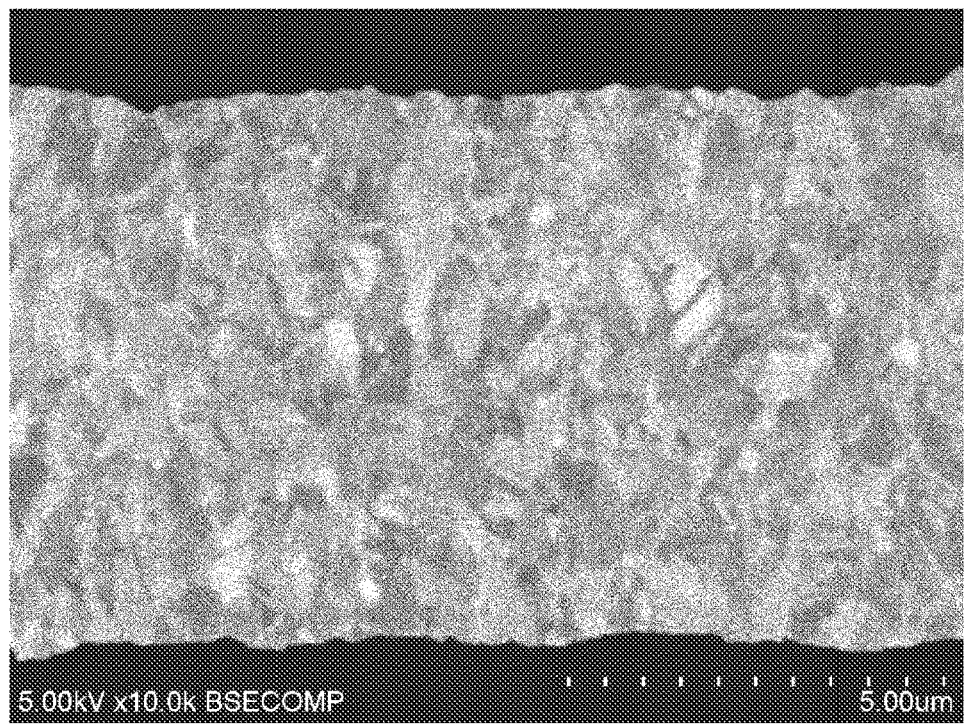
FIG. 1A is one before heating.
Figure 1B:
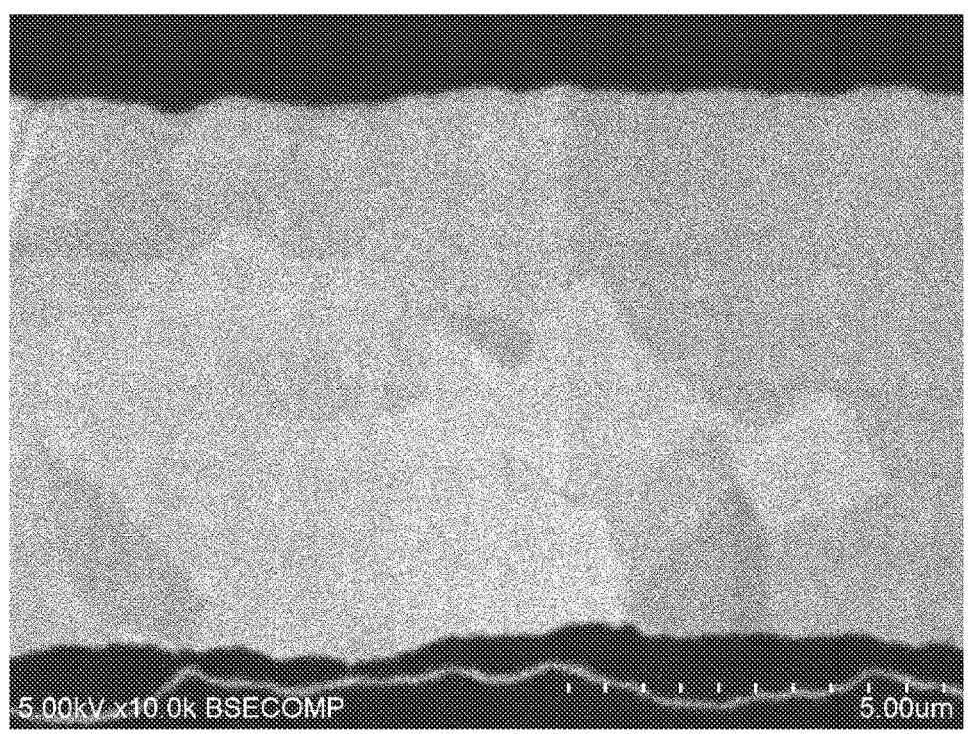
FIG. 1B is one after heating.

Embodiments of an electrolytic copper foil and a method for producing the same according to the present invention will be described below. However, the present invention is not limited by the embodiments described below.
Electrolytic Copper Foil In the electrolytic copper foil of the present embodiment, the carbon content in the copper foil is 5 ppm or less, the sulfur content is 3 ppm or less, the oxygen content is 5 ppm or less, the nitrogen content is 0.5 ppm or less, and the total content of carbon, sulfur, oxygen, nitrogen, and hydrogen is 15 ppm or less, and the number of grains is 8.0 to 12.0/μm². This electrolytic copper foil is characterized in that the number of grains changes to 0.6 to 1.0/μm² by heating at 150° C. for 1 hour.

The number of grains is measured based on the cutting method defined in JIS H 0501 (Methods for Estimating Average Grain Size of Wrought Copper and Copper Alloys). Specifically, first, as the crystal grain size, crossing line segments of known length are drawn on an image or photograph of a scanning electron microscope, the number of grains completely cut by each line segment is counted, and the average value (number) of the number of grains is calculated. Next, from the measured total area of the known length and this number of grains, the area (μm²) per grain is calculated, and from the reciprocal of the area (μm²) per grain, the number of grains per μm² is obtained. The measurement before the heating and the measurement after the heating were performed at room temperature (20° C.).

In this manner, in the electrolytic copper foil of the present embodiment, the number of grains is 8.0 to 12.0/μm², and therefore, at the time of the production of the electrolytic copper foil, the electrolytic copper foil is relatively hard, easy to produce, and easily to handle. When used as a material for the negative electrode current collector of a secondary battery, this electrolytic copper foil is subjected to heating at least at 150° C. for 1 hour in order to volatilize the solvent used at the time of secondary battery making. Presumably, when the electrolytic copper foil of the present embodiment including few impurities at the crystal grain boundaries is subjected to the heating, the grains become significantly larger due to recrystallization, and the number of grains turns to 0.6 to 1.0/μm². Thus, the electrical conductivity of the electrolytic copper foil increases, contributing greatly to the performance improvement of the secondary battery. At the same time, the electrolytic copper foil becomes relatively soft and has preferred flexibility as the negative electrode current collector of the secondary battery.

The electrolytic copper foil of the present embodiment has an electrical conductivity of 96.8 to 99.7% IACS, and by heating at 150° C. for 1 hour, the electrical conductivity increases by at least 2% IACS, and the electrical conductivity changes to 99.7 to 103.0% IACS.

The electrical conductivity is measured based on JIS C 6515 (Copper foil for printed wiring boards). The electrical conductivity herein represents a comparison value that is the % value of the volume resistivity of the electrolytic copper foil with respect to the volume resistivity ($1.7241 \times 10^{-8}$ Ωm) at 20° C. in IACS (International Annealed Copper Standard) when it is regarded as 100%, and the electrical conductivity is expressed in % IACS. The volume resistivity of the electrolytic copper foil is measured based on IEC 60249-1 described in JIS C 6515. The measurement before the heating and the measurement after the heating were performed at room temperature (20° C.).

In this manner, the electrolytic copper foil of the present embodiment has an electrical conductivity of 96.8 to 99.7% IACS at the time of production, but as described above, by heating at least at 150° C. for 1 hour at the time of producing secondary batteries, the electrical conductivity increases by at least 2% IACS, and the electrolytic copper foil has an electrical conductivity of as high as 99.7 to 103.0% IACS. Therefore, the performance of the secondary battery can be greatly improved, particularly because a decrease in reliability can be prevented even if the secondary battery generates heat, and for other reasons.

The measurement of the contents of carbon, sulfur, oxygen, nitrogen, and hydrogen in the electrolytic copper foil is performed by an elemental analysis apparatus. The carbon content is preferably 4 ppm or less. The sulfur content is preferably 2 ppm or less. The oxygen content is preferably 4 ppm or less. The nitrogen content is preferably 0.4 ppm or less. The lower limit of any of the carbon content, the sulfur content, the oxygen content, and the nitrogen content is not particularly limited, but is preferably 0.1 ppm or more. The total content of carbon, sulfur, oxygen, nitrogen, and hydrogen is preferably 10 ppm or less, more preferably 8 ppm. The lower limit of the total content of carbon, sulfur, oxygen, nitrogen, and hydrogen is not particularly limited but is preferably 0.5 ppm or more.
Method for Producing Electrolytic Copper Foil An embodiment of a method for producing the electrolytic copper foil will be described below. The method for producing the electrolytic copper foil according to the present embodiment includes a cleaning step, a dissolution step, and an electrolysis step.
Cleaning Step The surface of No. 1 nugget copper defined in JIS H 2109 used as a copper raw material is coated with organic impurities such as a coating material and dyeing oil. When these are mixed into an electrolytic solution, the content of impurities in the electrolytic copper foil increases, and the contents of carbon, sulfur, oxygen, nitrogen, and hydrogen described above cannot be set at the defined values or less. Thus, in order to control the contents of carbon, sulfur, oxygen, nitrogen, and hydrogen in the electrolytic copper foil, the copper raw material is cleaned.

Examples of the method for cleaning the copper raw material include heat cleaning, compressed steam cleaning, immersion acid cleaning, ultrasonic cleaning, ozone water cleaning, and superheated steam cleaning. One cleaning method among these may be performed, or two or more cleaning methods may be combined.

The heat cleaning is a method of placing the copper raw material in a high temperature heat cleaning furnace at 600 to 900° C. under an air atmosphere, heating the copper raw material to sublime or ash dirt on the surface, then taking the copper raw material out of the furnace, and water-washing the copper raw material to remove impurities on the surface of the copper raw material.

The heating temperature is preferably 700° C. or more, more preferably 800° C. or more. The compressed steam cleaning is a method of cleaning dirt on the surface of the copper raw material with high temperature and high pressure steam at a temperature of 80 to 100° C. and a pressure of 3 to 5 MPa to remove impurities on the surface.

The immersion acid cleaning is a method of immersing the copper raw material in an acid such as sulfuric acid to dissolve the surface of the copper raw material to remove it together with impurities on the surface.

The ultrasonic cleaning is a method of immersing the copper raw material in a cleaning liquid such as water, followed by applying ultrasonic waves to remove impurities on the surface of the copper raw material by the generated shock waves. The temperature of the cleaning liquid is preferably 40 to 60° C., and the frequency of the ultrasonic waves is preferably 20 to 40 kHz.

The ozone water cleaning is a method of immersing the copper raw material in ozone water to remove impurities on the surface of the copper raw material. The ozone concentration of the ozone water is preferably 1 to 5 ppm, and the temperature of the ozone water is preferably 20 to 30° C.

The superheated steam cleaning is a method of removing impurities on the surface of the copper raw material with superheated steam that is heat-radiating $H_2O$ gas obtained by further heating a saturated steam having been evaporated at 100° C. The temperature of the superheated steam is preferably 300 to 400° C., and the pressure is substantially atmospheric pressure. As the water used in the cleaning step, distilled water or ion-exchanged water is preferably used.

Dissolution Step

In the dissolution step, the copper raw material after the cleaning step is dissolved in sulfuric acid to obtain an electrolytic solution. The copper concentration in the electrolytic solution is preferably 200 to 400 g/L, more preferably 150 to 350 g/L, in terms of copper sulfate ($CuSO_4.5H_2O$). The total organic carbon (TOC) in the electrolytic solution is 10 ppm or less. The TOC can be measured by using a commercially available total organic carbon meter. When the TOC in the electrolytic solution exceeds 10 ppm, recrystallization does not proceed after the predetermined heating, in the electrolytic copper foil obtained by the electrolysis step described later, the change in the number of grains per unit area is small, the electrical conductivity does not change either, and thus, the desired electrolytic copper foil cannot be obtained. The TOC in the electrolytic solution is more preferably 5 ppm or less.

The TOC in the electrolytic solution can be achieved by one of the heat cleaning, compressed steam cleaning, and immersion acid cleaning in the cleaning step or by combining these, and further removal of impurities in the electrolytic solution may be performed in the dissolution step by a method, such as the treatment of the electrolytic solution by an activated carbon filtration apparatus, and the oxidative degradation of organic matter present in the electrolytic solution by an ozone activation apparatus, and thus, the TOC in the electrolytic solution can be decreased.

When the electrolytic solution for the electrolytic copper foil according to the present invention is prepared, additives which are usually used in an electrolytic solution, such as thiourea, gum arabic, gelatin, and glue can be used only when they do not co-deposit in a coper foil.

Electrolysis Step

In the electrolysis step, the electrolytic solution obtained in the dissolution step is electrolyzed to obtain an electrolytic copper foil. Examples of the electrolysis method include, but are not particularly limited to, a method of electrolyzing the electrolytic solution by an electrolysis apparatus having a rotary drum-like or plate-like cathode can be used. The current density in the electrolysis step is not particularly limited, but is preferably 20 to 200 A/dm$^2$, and is more preferably 30 to 120 A/dm$^2$. The liquid temperature in the electrolysis step is not particularly limited, but it is preferably 25 to 80° C., and is more preferably 30 to 70° C. The thickness of the electrolytic copper foil obtained by the electrolysis step is preferably 3 to 210 µm, and is more preferably 5 to 100 µm.

In the electrolytic copper foil obtained in this manner, the carbon content in the copper foil is 5 ppm or less, the sulfur content is 3 ppm or less, the oxygen content is 5 ppm or less, the nitrogen content is 0.5 ppm or less, and the total content of carbon, sulfur, oxygen, nitrogen, and hydrogen is 15 ppm or less, and the number of grains is 8.0 to 12.0/µm$^2$. This electrolytic copper foil is characterized in that the number of grains changes to 0.6 to 1.0/µm' by heating at 150° C. for 1 hour. In addition, this electrolytic copper foil has an electrical conductivity of 96.8 to 99.7% IACS. This electrolytic copper foil is characterized in that the electrical conductivity also increases by at least 2% IACS and changes to 99.7 to 103.0% IACS when the electrolytic copper foil is heated at 150° C. for 1 hour. A roughening-treated layer, a heat-resistant layer, a rustproof layer, or the like may be provided, as needed, on the surface of the electrolytic copper foil obtained in this manner.

EXAMPLES

The present invention will be described in more detail below by giving Examples and Comparative Examples of the present invention. However, the present invention is not limited to the following Examples.

Example 1

(1) Production of Electrolytic Copper Foil

First, No. 1 nugget copper defined in JIS H 2109 that was a copper raw material was subjected to heat cleaning as primary cleaning and next subjected to immersion acid cleaning as secondary cleaning. In the heat cleaning, the copper raw material was housed in a rotary kiln as a high temperature heat cleaning furnace, heated to about 800 to 900° C. under an air atmosphere to sublime or ash dirt on the surface of the copper raw material, and then water-washed to remove impurities on the surface of the copper raw material. In the immersion acid cleaning, the copper raw material was subjected to immersion treatment for 20 minutes using a 100 g/L sulfuric acid aqueous solution, to remove impurities adhering to the surface of the copper raw material. Then, the copper raw material cleaned in this manner was dissolved in sulfuric acid to obtain a copper sulfate solution. This copper sulfate solution was filtered through a filtration apparatus to obtain an electrolytic solution of the following composition. As the sulfuric acid, purified sulfuric acid was used.

Copper sulfate ($CuSO_4.5H_2O$): 280 g/L
Sulfuric acid ($H_2SO_4$): 90 g/L

In addition, the total organic carbon (TOC) of the electrolytic solution at this time was measured. The measurement of the TOC in the electrolytic solution was performed by a total organic carbon meter (SHIMADZU CORPORATION, TOC-LCPH). Then, using this electrolytic solution, electrolysis was performed under the conditions of a current density of 50 A/dm$^2$ and a liquid temperature of 40° C. by an electrolysis apparatus including precious metal oxide-coated titanium as an anode and a titanium rotary drum as a cathode, to obtain an 8 μm thick electrolytic copper foil.

(2) Characteristics Test of Electrolytic Copper Foil

Using the obtained electrolytic copper foil as a sample, the measurement of the content of impurities in the electrolytic copper foil was performed. In the measurement of impurities, an elemental analysis apparatus (HORIBA, Ltd., EMIA-Expert) was used for the measurement of the content of carbon and sulfur, an elemental analysis apparatus (HORIBA, Ltd., EMGA-920) was used for the measurement of the content of oxygen and nitrogen, and an elemental analysis apparatus (HORIBA, Ltd., EMGA-921) was used for the measurement of the content of hydrogen.

In addition, using the obtained electrolytic copper foil as a sample, characteristics tests of the number of grains and electrical conductivity of the electrolytic copper foil were performed. The number of grains was measured at room temperature (20° C.) based on the cutting method described in JIS H 0501. The electrical conductivity was measured at room temperature (20° C.) based on JIS C 6515 and IEC 60249-1. The number of grains and the electrical conductivity were also measured for a sample of the electrolytic copper foil heated at 150° C. for 1 hour and then returned to room temperature (20° C.). The measurement results are shown in Table 1.

Example 2

An electrolytic copper foil was produced as in Example 1 except that when a copper sulfate solution (electrolytic solution) was made in the production of the electrolytic copper foil, compressed steam cleaning using high temperature and high pressure steam at a temperature of about 100° C. and a pressure of 4.01 MPa was performed as the cleaning step. Then, the characteristics tests were performed, and the results are shown in Table 1.

Example 3

An electrolytic copper foil was produced as in Example 1, except that when a copper sulfate solution (electrolytic solution) was made in the production of the electrolytic copper foil, only immersion acid cleaning was performed as the cleaning step. Then, the characteristics tests were performed, and the results are shown in Table 1.

Example 4

An electrolytic copper foil was produced as in Example 1 except that when a copper sulfate solution (electrolytic solution) was made in the production of the electrolytic copper foil, ultrasonic cleaning at a temperature of about 50° C. and a frequency of 28 kHz was performed as the cleaning step. Then, the characteristics tests were performed, and the results are shown in Table 1.

Example 5

An electrolytic copper foil was produced as in Example 1 except that when a copper sulfate solution (electrolytic solution) was made in the production of the electrolytic copper foil, cleaning using ozone water at a temperature of about 27° C. and a concentration of 1.5 ppm was performed as the cleaning step. Then, the characteristics tests were performed, and the results are shown in Table 1.

Example 6

An electrolytic copper foil was produced as in Example 1, except that when a copper sulfate solution (electrolytic solution) was made in the production of the electrolytic copper foil, cleaning using superheated steam at a temperature of about 350° C. was performed as the cleaning step. Then, the characteristics tests were performed, and the results are shown in Table 1.

Comparative Example 1

An electrolytic copper foil was produced as in Example 1 except that when a copper sulfate solution (electrolytic solution) was made in the production of the electrolytic copper foil, the cleaning step was omitted. Then, the characteristics tests were performed, and the results are shown in Table 1.

Comparative Example 2

An electrolytic copper foil was produced as in Example 1, except that when a copper sulfate solution (electrolytic solution) was made in the production of the electrolytic copper foil, 3 ppm of gelatin and 20 ppm of chlorine ions were contained in the electrolytic solution. Then, the characteristics tests were performed, and the results are shown in Table 1.

Comparative Example 3

An electrolytic copper foil was produced as in Example 1, except that when a copper sulfate solution (electrolytic solution) was made in the production of the electrolytic copper foil, 10 ppm of gelatin was contained in the electrolytic solution. Then, the characteristics tests were performed, and the results are shown in Table 1.

Comparative Example 4

An electrolytic copper foil was produced as in Example 1, except that when a copper sulfate solution (electrolytic solution) was made in the production of the electrolytic copper foil, 3 ppm of enzymatically degraded gelatin was contained in the electrolytic solution. Then, the characteristics tests were performed, and the results are shown in Table 1.

TABLE 1

| | TOC of electrolytic solution (ppm) | Impurity content in copper foil (ppm) | | | | | | Number of grains (number/μm²) | | Electrical conductivity (% IACS) | |
|---|---|---|---|---|---|---|---|---|---|---|---|
| | | C | S | O | N | H | Total | At time of production | After heating | At time of production | After heating |
| Example 1 | 1 | 1.5 | 1.8 | 2.8 | 0.3 | 0.5 | 6.9 | 8.0 | 0.6 | 100.3 | 103.0 |
| Example 2 | 3 | 1.8 | 1.5 | 3.3 | 0.5 | 0.5 | 7.6 | 10.0 | 0.8 | 99.0 | 101.6 |
| Example 3 | 5 | 2.1 | 1.7 | 3.1 | 0.4 | 0.5 | 7.8 | 12.0 | 1.0 | 96.8 | 99.7 |
| Example 4 | 5 | 2.1 | 1.8 | 3.2 | 0.4 | 0.5 | 8.0 | 11.0 | 0.9 | 97.7 | 100.2 |
| Example 5 | 8 | 2.4 | 1.7 | 3.1 | 0.4 | 0.5 | 8.1 | 10.8 | 1.0 | 97.8 | 99.9 |
| Example 6 | 3 | 1.7 | 1.5 | 3.1 | 0.5 | 0.5 | 7.3 | 10.5 | 0.9 | 99.2 | 101.8 |
| Comparative Example 1 | 11 | 7.9 | 5.9 | 5.9 | 0.9 | 0.6 | 16.1 | 5.9 | 7.9 | 99.3 | 99.5 |
| Comparative Example 2 | 22 | 9.4 | 6.2 | 6.2 | 1.5 | 0.9 | 24.8 | 6.2 | 7.4 | 97.4 | 97.3 |
| Comparative Example 3 | 56 | 46.3 | 8.3 | 8.3 | 19.1 | 9.2 | 178.2 | 8.3 | 8.2 | 91.2 | 91.4 |
| Comparative Example 4 | 42 | 27.4 | 20.1 | 20.1 | 1.6 | 1.1 | 52.4 | 20.1 | 19.9 | 97.5 | 97.6 |

As shown in Table 1, it was confirmed that for the electrolytic copper foils of Examples 1 to 6 obtained from electrolytic solutions having a TOC of 10 ppm or less, the number of grains was 8.0/μm² or more, but became 1.0/μm² or less by performing heating at 150° C. for 1 hour, and the grains became significantly larger due to recrystallization. In addition, for the electrolytic copper foils of Examples 1 to 6, the electrical conductivity showed an increase of 2% IACS or more and turned to 99.7% IACS or more by performing heating at 150° C. for 1 hour. By contrast, for the electrolytic copper foils of Comparative Examples 1 to 4 obtained from electrolytic solutions having a TOC exceeding 10 ppm, even if heating at 150° C. for 1 hour was performed, recrystallization did not proceed, and the change in the number of grains was small, and the electrical conductivity did not change either.

The invention claimed is:

1. An electrolytic copper foil having a carbon content of 5 ppm by weight or less, a sulfur content of 3 ppm by weight or less, an oxygen content of 5 ppm by weight or less, and a nitrogen content of 0.5 ppm by weight or less; having a total content of carbon, sulfur, oxygen, nitrogen, and atomic hydrogen of 15 ppm by weight or less; not including any other metal elements; and having a number of grains of 8.0 to 12.0/μm²,
    wherein the number of grains changes to 0.6 to 1.0/μm² by heating the electrolytic copper foil at 150° C. for 1 hour.

2. The electrolytic copper foil according to claim 1, having an electrical conductivity of 96.8 to 99.7% IACS,
    wherein the electrical conductivity increases by at least 2% IACS and changes to 99.7 to 103.0% IACS by heating the electrolytic copper foil at 150° C. for 1 hour.

3. A method for producing an electrolytic copper foil, comprising:
    cleaning a copper raw material;
    dissolving the copper raw material after the cleaning to obtain an electrolytic solution having a total organic carbon (TOC) of 10 ppm by weight or less; and
    electrolyzing the electrolytic solution to obtain an electrolytic copper foil having a carbon content of 5 ppm by weight or less, a sulfur content of 3 ppm by weight or less, an oxygen content of 5 ppm by weight or less, and a nitrogen content of 0.5 ppm by weight or less; having a total content of carbon, sulfur, oxygen, nitrogen, and atomic hydrogen of 15 ppm by weight or less; not including any other metal elements; and having a number of grains of 8.0 to 12.0/μm², wherein the number of grains changes to 0.6 to 1.0/μm² by heating the electrolytic copper foil at 150° C. for 1 hour.

4. The method for producing an electrolytic copper foil according to claim 3, wherein the cleaning is carried out by heat cleaning, compressed steam cleaning, immersion acid cleaning, or a combination thereof, thereby obtaining the electrolytic solution having a TOC of 10 ppm by weight or less in the dissolving.

5. The method for producing an electrolytic copper foil according to claim 3, wherein the cleaning is carried out by ultrasonic cleaning, ozone water cleaning, superheated steam cleaning, or a combination thereof, thereby obtaining the electrolytic solution having a TOC of 10 ppm by weight or less in the dissolving.

* * * * *